United States Patent
Schmidt et al.

(10) Patent No.: US 9,090,141 B2
(45) Date of Patent: Jul. 28, 2015

(54) VEHICLE WHEEL SUSPENSION WITH A HYDRAULIC VIBRATION DAMPER

(71) Applicant: Bayerische Motoren Werke Aktiengesellschaft, Munich (DE)

(72) Inventors: Roland Schmidt, Stockdorf (DE); Serge Vos, Munich (DE); Holger Klein, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/245,560

(22) Filed: Apr. 4, 2014

(65) Prior Publication Data
US 2014/0217693 A1    Aug. 7, 2014

Related U.S. Application Data

(63) Continuation of application No. PCT/EP2012/067169, filed on Sep. 4, 2012.

(30) Foreign Application Priority Data

Oct. 6, 2011 (DE) .......................... 10 2011 084 089

(51) Int. Cl.
*B60G 11/26* (2006.01)
*B60G 11/30* (2006.01)
*B60G 17/027* (2006.01)

(52) U.S. Cl.
CPC ............... *B60G 11/26* (2013.01); *B60G 11/30* (2013.01); *B60G 17/0272* (2013.01); *B60G 2202/12* (2013.01); *B60G 2500/30* (2013.01)

(58) Field of Classification Search
USPC ........................................ 280/124.162, 5.514
See application file for complete search history.

(56) References Cited

U.S. PATENT DOCUMENTS 4,478,431 A * 10/1984 Muller et al. ............... 280/6.159
4,872,702 A * 10/1989 Medley ....................... 280/6.159
(Continued)

FOREIGN PATENT DOCUMENTS

DE    101 21 918 A1    11/2002
DE    103 06 157 A1    8/2004
(Continued)

OTHER PUBLICATIONS

International Search Report (PCT/ISA/210) with English translation dated Dec. 5, 2012 (Eight (8) pages).
(Continued)

*Primary Examiner* — Nicole Verley
(74) *Attorney, Agent, or Firm* — Crowell & Moring LLP

(57) ABSTRACT

A vehicle wheel suspension is provided having a hydraulic vibration damper, which is connected in parallel to a suspension spring which proportionally supports the vehicle body. A rebound spring is provided, which preferably and typically becomes effective in the event of larger spring deflection distances. The support point of the rebound spring is displaceable in relation to the damper housing by way of a spring support piston, which is provided therein and is displaceable by fluid externally supplied with pressure via pump. In this case, the pump is connected to a pressure accumulator for the fluid and delivers fluid out of the pressure accumulator into the damper housing or out of the damper housing back into the pressure accumulator. The absolute value of the spring constant of the pressure accumulator is at least in the order of magnitude of the spring constant of the associated suspension spring or springs, or is greater.

2 Claims, 1 Drawing Sheet

(56) References Cited

U.S. PATENT DOCUMENTS

| | | | | |
|---|---|---|---|---|
| 5,211,420 | A | * | 5/1993 | Iwashita ..................... 280/5.503 |
| 5,215,327 | A | * | 6/1993 | Gatter et al. ................ 280/5.515 |
| 5,231,583 | A | * | 7/1993 | Lizell .............................. 701/37 |
| 5,342,023 | A | * | 8/1994 | Kuriki et al. ................ 267/64.17 |
| 7,341,263 | B2 | * | 3/2008 | Kuhn et al. ............ 280/124.157 |
| 7,611,152 | B2 | * | 11/2009 | van der Knaap ........... 280/5.507 |
| 7,740,256 | B2 | * | 6/2010 | Davis ..................... 280/124.157 |
| 8,672,337 | B2 | * | 3/2014 | van der Knaap et al. ...................... 280/124.106 |

FOREIGN PATENT DOCUMENTS

| | | |
|---|---|---|
| DE | 101 21 918 B4 | 10/2004 |
| DE | 103 24 993 A1 | 12/2004 |
| DE | 103 53 025 A1 | 6/2005 |
| DE | 10 2004 019 991 A1 | 11/2005 |
| DE | 10 2010 007 237 A1 | 9/2010 |
| DE | 10 2009 045 051 A1 | 3/2011 |
| EP | 0 148 060 A2 | 7/1985 |
| EP | 1 477 343 A2 | 11/2004 |
| FR | 2 726 791 A1 | 5/1996 |
| JP | 2006-131066 A | 5/2006 |
| JP | 2007-30665 A | 2/2007 |

OTHER PUBLICATIONS

German Search Report with English translation dated Jun. 19, 2012 (Ten (10) pages).

* cited by examiner

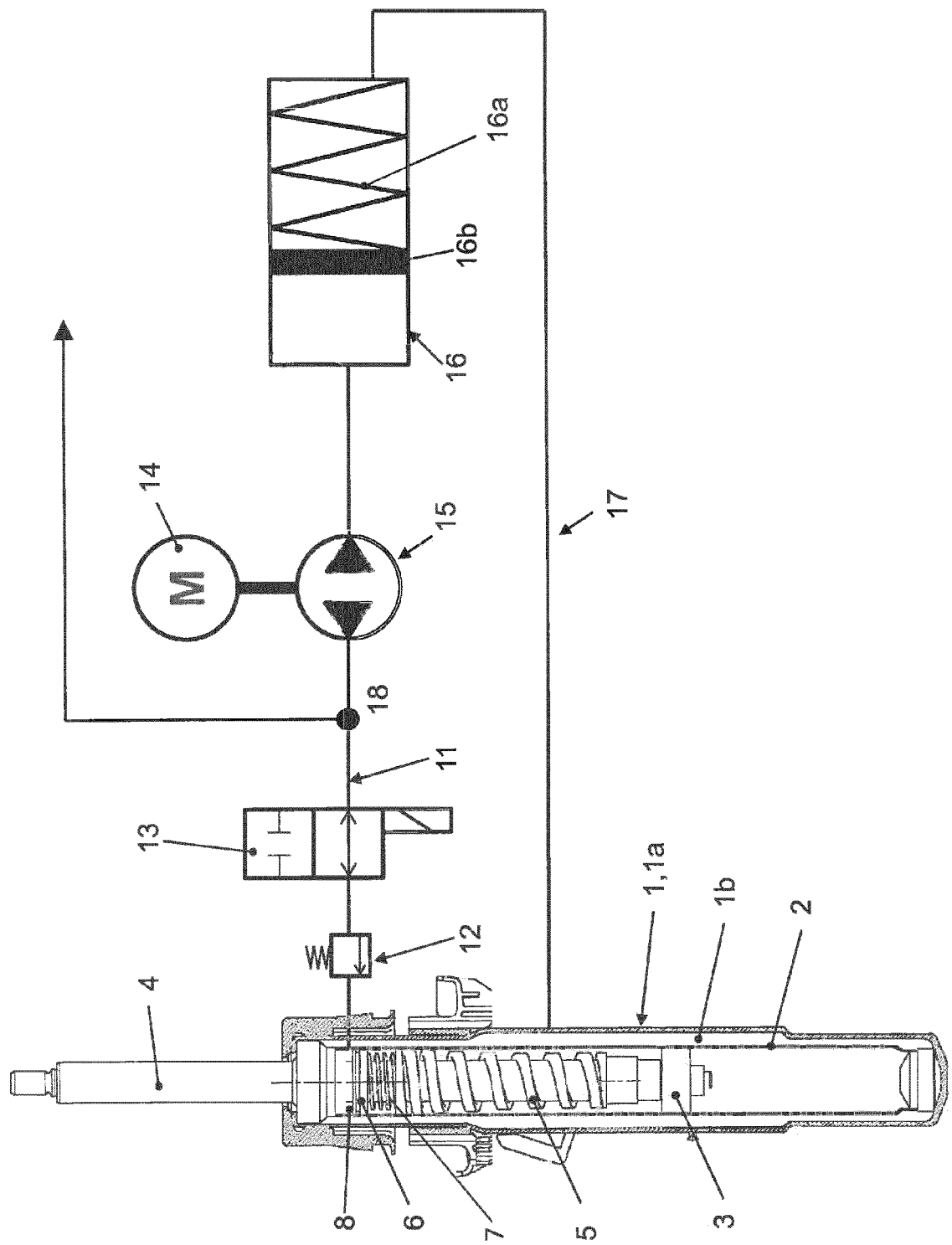

VEHICLE WHEEL SUSPENSION WITH A HYDRAULIC VIBRATION DAMPER

CROSS REFERENCE TO RELATED APPLICATIONS

This application is a continuation of PCT International Application No. PCT/EP2012/067169, filed Sep. 4, 2012, which claims priority under 35 U.S.C. §119 from German Patent Application No. 10 2011 084 089.3, filed Oct. 6, 2011, the entire disclosures of which are herein expressly incorporated by reference.

BACKGROUND AND SUMMARY OF THE INVENTION

The invention relates to a vehicle wheel suspension having a hydraulic vibration damper, which is connected in parallel to a suspension spring that proportionally supports the vehicle body, and in which vibration damper a rebound spring is provided, which preferably and typically first becomes effective in the event of larger rebound travel. The support point of the rebound spring is displaceable in relation to the damper housing by a spring support piston, which is provided therein and is displaceable from the outside by a fluid supplied with pressure via a pump. With respect to the prior art, reference is made to DE 10 2004 019 991 A1, as well as DE 101 21 918 B4.

In the above first-mentioned DE 10 2004 019 991 A1 document, a vibration damper of a wheel suspension having an auxiliary spring made of an elastomeric material is described, which is connected in parallel to the typical suspension spring and the support of which in relation to the vehicle body is adjustable via an activatable piston arrangement in relation to the longitudinal axis of the piston rod of the damper, which is referred to hereafter in the present case as the damper rod. This adjustment is performed hydraulically with delivery of the hydraulic medium using a pump driven by a motor, which can be assisted in particular by a hydraulic pressure accumulator, to display a high system dynamic response. A level-regulating intervention is possible using such an adjustment of the auxiliary spring, i.e., the vehicle body is to be able to be raised or lowered as needed.

A spring-damper system having a springy stop is also described in the second-mentioned DE 101 21 918 B4, wherein both an auxiliary spring, which acts as a pressure stage stop and is formed by an elastomeric body, and also a rebound spring for the traction stage of the damper, can be influenced by way of so-called stop distance in such a manner, or are concretely displaceable within the damper housing along the damper rod, such that the tendency of the vehicle body to roll in relation to the wheels when cornering is counteracted.

In the present case, it has been recognized that in any case when a suspension spring, which is in parallel to the damper, is implemented in the form of a typical mechanical coiled spring, solely a displacement ability of the rebound spring, as disclosed in the above-explained document, which comes into effect in the event of stronger spring deflection of the vehicle body in relation to the wheels, i.e., in the event of a larger body movement away from the roadway, opens up the possibility of intentionally lowering the vehicle body, without, as specified in DE 101 21 918 B4, a change of the suspension spring, which is implemented in this document as an air spring, having to be performed for this purpose.

It is hereby to be disclosed for such a vehicle wheel suspension, how the energy demand of the pump required to change the height level of the vehicle body above the roadway can be kept low or how, if the minimization of the energy demand is not a paramount goal, such a wheel suspension can be designed particularly safely with respect to the parking of the vehicle. The solution to this object is characterized in that the pump is connected to a pressure accumulator for the fluid and fluid is delivered out of this pressure accumulator into the damper housing or out of the damper housing back into the pressure accumulator, wherein the absolute value of the spring constant of the pressure accumulator is at least in the order of magnitude of the spring constant of the associated suspension spring or, in the case of multiple suspension springs having associated vibration dampers, which are associated with one pressure accumulator, of the spring constants of these suspension springs, or greater.

If a pressure accumulator is provided for the fluid, which is delivered with overpressure by a pump for a desired displacement of the spring support piston in the damper housing, from which pressure accumulator this pump continuously already acquires the fluid under overpressure, of course, less energy is thus required for this fluid delivery than if the pump had to suction the fluid from an "unpressurized" collection container. Energy is also required for the pressure buildup in the pressure accumulator, however, in the event of reasonable activation, a part of the power, which reaches the rebound spring in the event of a spring deflection movement of the vehicle body and is quasi-released in this case, can be used for this purpose. Furthermore, the time factor is a significant advantage of such a pressure accumulator, in that with the aid of its stored energy, a desired displacement of the spring support piston can be displayed within a relatively short time span, while the renewed pressure buildup in the pressure accumulator can be performed extended over time, so that the required delivery power of the pump can be kept relatively low.

According to the invention, the absolute value of the spring constant of the pressure accumulator is at least in the order of magnitude of the spring constant of the associated suspension spring, or greater. A pressure accumulator for a fluid always has a spring element in the broadest meaning, which is tensioned further upon charging of the pressure accumulator with a pressurized fluid. For example, this spring element can be a coiled compression spring element, which is supported on a displaceable piston, which delimits the pressure chamber of the pressure accumulator. Alternatively, a gas spring volume is also possible. Of course, such a spring element of a pressure accumulator has a defined spring constant (also called spring rate or spring stiffness). If this spring constant has the same absolute value as the spring rate of the suspension spring assigned to this pressure accumulator, via which the vehicle body is proportionally supported on the respective wheel of the vehicle, theoretically, in any case, no pump power is required for the displacement of the spring support piston, which is provided in the respective vibration damper, in the sense of tensioning the rebound spring provided therein. However, friction losses are actually to be overcome, for which a small pump power is required. Of course, however, it is then relatively small.

In the explanation of the preceding paragraph, it was presumed that a single vibration damper having a spring support piston, with which a single suspension spring is associated, is associated with a pressure accumulator according to the invention, i.e., this explanation relates to the spring-damper unit in the wheel suspension of a single vehicle wheel. However, this also applies for an arrangement which is optimized with respect to the construction expenditure, in which a single pressure accumulator according to the invention is associated with all wheels of the vehicle (in the case of a passenger automobile, these are the two front wheels and the two rear wheels). Four suspension springs are then active in a parallel arrangement to one another. However, simultaneously four vibration dampers according to the invention, each having one spring support piston, are also provided, which are also active in parallel to one another. Thus, if the spring constants of all suspension springs are equal, such a parallel circuit of the suspension springs to the respective associated vibration dampers thus remains without an effect with respect to a single associated pressure accumulator, i.e., the relationships explained in the preceding paragraph also apply in unchanged form for this purpose. For this reason, it is discussed, that in the case of multiple suspension springs having associated vibration dampers, which are associated with one pressure accumulator, the absolute value of the spring constant of the pressure accumulator is at least in the order of magnitude of the spring constants of the suspension springs or greater. These explained relationships also apply in this case if the spring constants of the multiple suspension springs only differ slightly from one another. However, if significantly harder (or softer) suspension springs (i.e., those having substantially higher or substantially lower spring constant) are installed on one axle of the vehicle than on the other axle of the vehicle, it could be advisable to provide a separate pressure accumulator according to the invention for each of these axles of the vehicle.

Heretofore, only the advantage was explained which results from a substantially equal absolute value of the spring constant of the pressure accumulator and the spring constant of the associated suspension spring(s). If the absolute value of the spring constant of the pressure accumulator is greater than the spring constant of the suspension spring(s) associated with this pressure accumulator, a safety function is provided, with the aid of which, in the event of suitable switching of a valve, which is provided in the hydraulic (or fluidic in general) connection between the pressure accumulator and a chamber (so-called support chamber), which is provided in the damper housing and is delimited by the spring support piston, it can be ensured that the vehicle body moves into its completely lowered position when the vehicle is shut down and also maintains this position until the vehicle is put back into operation. This can be necessary, for example, in low garages or on decks of ferries having a low ceiling height. This mentioned valve must only be opened and remain open and therefore allow a fluidic connection between the pressure accumulator and said support chamber in the damper housing, which can be provided easily and without energy demand using a solenoid valve which is open when deenergized (or an arbitrary bistable valve).

In the sense of an advantageous refinement, the mentioned spring support piston, which, while displaceable in the damper housing, delimits a support chamber fillable with the fluid, is held by a spring element, which is preferably supported on the rebound spring, in such a starting position that the volume of the support chamber, which essentially has ambient pressure, is minimized. With an intentional displacement of this spring support piston and a buildup of over pressure required for this purpose in the support chamber, the force of this mentioned spring element must then be overcome, however, the energy demand required for this purpose can be kept relatively small, if the spring force of this spring element is selected to be as small as possible.

Furthermore, it is proposed, as an operating method for a wheel suspension according to the invention, that a support chamber in the damper housing, which is fillable with the fluid (as which, in addition to a hydraulic medium, a gaseous medium and preferably air can also expressly be used), and via which the spring support piston is supported, is always to be set substantially free of overpressure by delivering fluid back to the pressure accumulator by use of the pump, when the height level of the vehicle body is not to be changed by targeted pre-tension of the rebound spring. Therefore, friction losses in the vibration damper are kept as small as possible. However, it is to be ensured that no overpressure is generated in the support chamber, in particular to avoid an undesired penetration or suctioning of air via piston seals or the like, in particular if a hydraulic medium is used as the fluid. In particular, a corresponding valve can be provided for this purpose in the line from the support chamber to the suction side of the pump, which valve blocks this line upon the presence of ambient pressure in the support chamber and simultaneous suction operation of the pump. Alternatively thereto, a so-called compensation volume can be provided, which can also prevent ambient air from being suctioned into the damper during emptying of the support chamber.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE shows an exemplary embodiment of the present invention, wherein, in addition to a vibration damper according to the invention shown in section, a pump, which is associated therewith or its so-called support chamber, having a pressure accumulator and valves, is shown schematically.

DETAILED DESCRIPTION OF THE DRAWING

Referring to the FIGURE, a vibration damper in the suspension of a wheel of a vehicle (for example, a passenger automobile) is identified with the reference sign 1, to which a suspension spring (not shown but readily understood by one of skill in the art), via which the vehicle body is supported on this wheel, is connected in parallel. Within the housing 1*a* of the vibration damper 1, the actual damper cylinder 2 is located, within which a damper piston 3 is guided so it is displaceable. As is typical, this damper piston 3 is borne by a damper rod 4. With its lower end section in the figure, the damper housing 1*a* is fastened on a wheel-guiding element of the wheel suspension, while the upper free end of the damper rod 4 is fastened on the vehicle body. The principle of operation of a vibration damper 1 described in this regard is known to a person skilled in the art and therefore does not have to be explained in greater detail.

As is also fundamentally known, a rebound spring 5 is provided in the vibration damper 1, which rebound spring 5 becomes effective in the event of a larger spring deflection movement between the wheel and the vehicle body, i.e., when the damper rod 4 (in the so-called traction rebound stage) is moved by a larger amount out of the damper cylinder 2 or out of the damper housing 1*a*. Of course, the present vibration damper 1 also contains a pressure stop spring, which becomes effective in the so-called pressure (compression) stage, however, this is not shown in the present case for the sake of clarity.

The rebound spring 5, which is implemented as a coiled compression spring, is fastened and supported on the damper piston 3 with its lower end in the figure. At the opposing end of the rebound spring 5, which is the upper end in the figure, a further spring element 7 implemented as a coiled compression spring is supported, on the other end of which a so-called spring support piston 6 rests, which is guided so it is displaceable in the damper cylinder 2. The function of this spring element 7, which is not absolutely necessary, will be described briefly hereafter.

On the side of the spring support piston 6, which faces away from the mentioned spring element 7 and the rebound spring 5, a so-called support chamber 8 is provided in the damper cylinder 2. The support chamber 8, which is closed on top in the illustration of the figure, is fillable via a fluid line 11, which penetrates the wall of the damper cylinder 2 and of the damper housing 1 a, with a fluid, in particular a hydraulic medium. As a function of the fluid pressure prevailing in this support chamber 8, the spring support piston 6 can then be displaced downward in relation to the damper rod 4 and in the direction of its longitudinal axis in the illustration of the figure, wherein with corresponding high fluid pressure in the support chamber 8, the rebound spring 5 can also be compressed in relation to the state shown in the figure. If, in the case of otherwise unchanged boundary conditions, the rebound spring 5 is compressed in such a manner, a force is thus introduced in this manner into the wheel suspension of the vehicle, which has the consequence that the damper piston 3 and the damper rod 4 are pushed further downward into the damper cylinder 2 in the illustration of the figure, so that the vehicle body is thereby lowered toward the roadway.

The fluid line 11 connected to the support chamber 8 and the elements contained therein or coupled thereto will now be discussed. Proceeding from the support chamber 8, in this fluid line 11, firstly a pressure limiting valve 12, which is not absolutely required, is provided, the function of which will be described briefly hereafter. This is followed by a 2/2-way valve provided in the fluid line 11 in the form of a solenoid valve, which is open when deenergized (or is bistable), and which can also be referred to as a simple black-and-white valve or open-closed valve and is identified with the reference sign 13. Its function could also be assumed by any arbitrary other switchable valve. A branch 18 to the structurally similar vibration dampers of the other vehicle wheels (not shown), from each of which identical valves 12, 13 are connected upstream, is provided between this valve and a pump 15. The pump 15 is driven by an electric motor 14 and has a reversible delivery direction. At its opposite end from the support chamber 8 of the damper 1 in relation to the pump 15, the fluid line 11 finally opens into a pressure accumulator 16 for the fluid or hydraulic medium. The pressure accumulator 6, as is typical in pressure accumulators, contains a pre-tensioned spring element 16a, which is supported in the present case on a pressure accumulator piston 16b delimiting the fluid pressure chamber of the pressure accumulator 16. The piston 16b and is displaceable in a cylinder. (Alternatively to such a pressure accumulator having spring element 16a, a pressure accumulator having a gas spring can also be used).

As was explained at the outset, the vehicle body of a vehicle equipped with a wheel suspension according to the invention can be lowered in the direction of the roadway, when a sufficient quantity of fluid (preferably, a hydraulic medium) is delivered under sufficient pressure into the support chamber 8 from the pressure accumulator 16, with the valve 13 open, through the pressure limiting valve 12. With recirculation of hydraulic fluid from the support chamber 8 back into the pressure accumulator 16 (also by the pump 15), the vehicle body is raised again under the action of the rebound spring 5, which therefore relaxes. As was explained in detail above, the absolute value of the spring constant of the spring element 16a pressure (and in short the spring constant of the pressure accumulator 16) is at least approximately as great as the spring constant of the suspension springs of the vehicle wheels.

The pressure limiting valve 12 is designed such that during the suctioning of hydraulic medium by the pump 15 out of the support chamber 8, no noteworthy partial vacuum can arise in the support chamber 8. Therefore, if the risk of a formation of a partial vacuum (in relation to the ambient pressure) in the support chamber 8 exists during a suction procedure of hydraulic fluid out of the support chamber 8, this pressure limiting valve 12 thus closes automatically.

In regard to the compression spring element 7, which is clamped between the end of the rebound spring 5 facing toward the damper piston 3 and the spring support piston 6, this element is used for the purpose of moving the spring support piston 6 back into a defined starting position, with which the volume of the support chamber 8 is minimal, when essentially ambient pressure prevails in the support chamber 8 (and therefore the hydraulic fluid previously delivered therein was or is being withdrawn).

Moreover, in the present case, the oil storage volume 1b of the vibration damper 1, which lies inside the damper housing 1a and outside the damper cylinder 2, is connected via a pressure relief line 17 to the unpressurized side of the pressure accumulator 16. However, this and a variety of further details, in particular of a design nature, can certainly be formed differently from the above explanations, without leaving the content and scope of the invention. In particular, it is to be noted that in the present exemplary embodiment, the damper piston 3 is guided in a damper cylinder 2, in which the spring support piston 6 is also guided, so that the support chamber 8 is at least partially located in the damper cylinder 2. However, the spring support piston 6 can alternatively also be guided so it is displaceable directly in the damper housing 1 a in any case, because of which in the present case it is not only mentioned that it or the rebound spring 5, which is supported thereon, of the spring support piston 6 is finally supported via the support chamber 8 on the damper housing 1a, but rather it is also mentioned that the hydraulic fluid which is supplied by the pump 15 to the support chamber 8 is delivered into the damper housing 1a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle wheel suspension, comprising:
   a hydraulic vibration damper connected in parallel to a suspension spring proportionally supporting the vehicle body, the vibration damper including:
   a dampening housing;
   a rebound spring that first becomes effective in an event of larger spring deflection distances,
   a spring support piston provided in the damper housing and being displaceable by fluid externally supplied with pressure by a pump,
   a support point of the rebound spring being displaceable in relation to the damper housing of the vibration damper by way of the spring support piston, wherein:
   the pump is connected to a pressure accumulator for said fluid and delivers fluid out of said pressure accumulator into the damper housing or out of the damper housing back into the pressure accumulator, and an absolute value of the spring constant of the pressure accumulator is at least on an order of magnitude of the spring constant of the associated suspension spring or, in the case of multiple suspension springs associated with one pressure accumulator, the spring constants of the multiple suspension springs, or is greater.

2. The vehicle wheel suspension according to claim 1, wherein the spring support piston which delimits a support chamber fillable with said fluid, is held in a starting position, which minimizes a volume of the support chamber, which has essentially ambient pressure, by a spring element, which is supported on the rebound spring.

\* \* \* \* \*